United States Patent Office 3,396,199
Patented Aug. 6, 1968

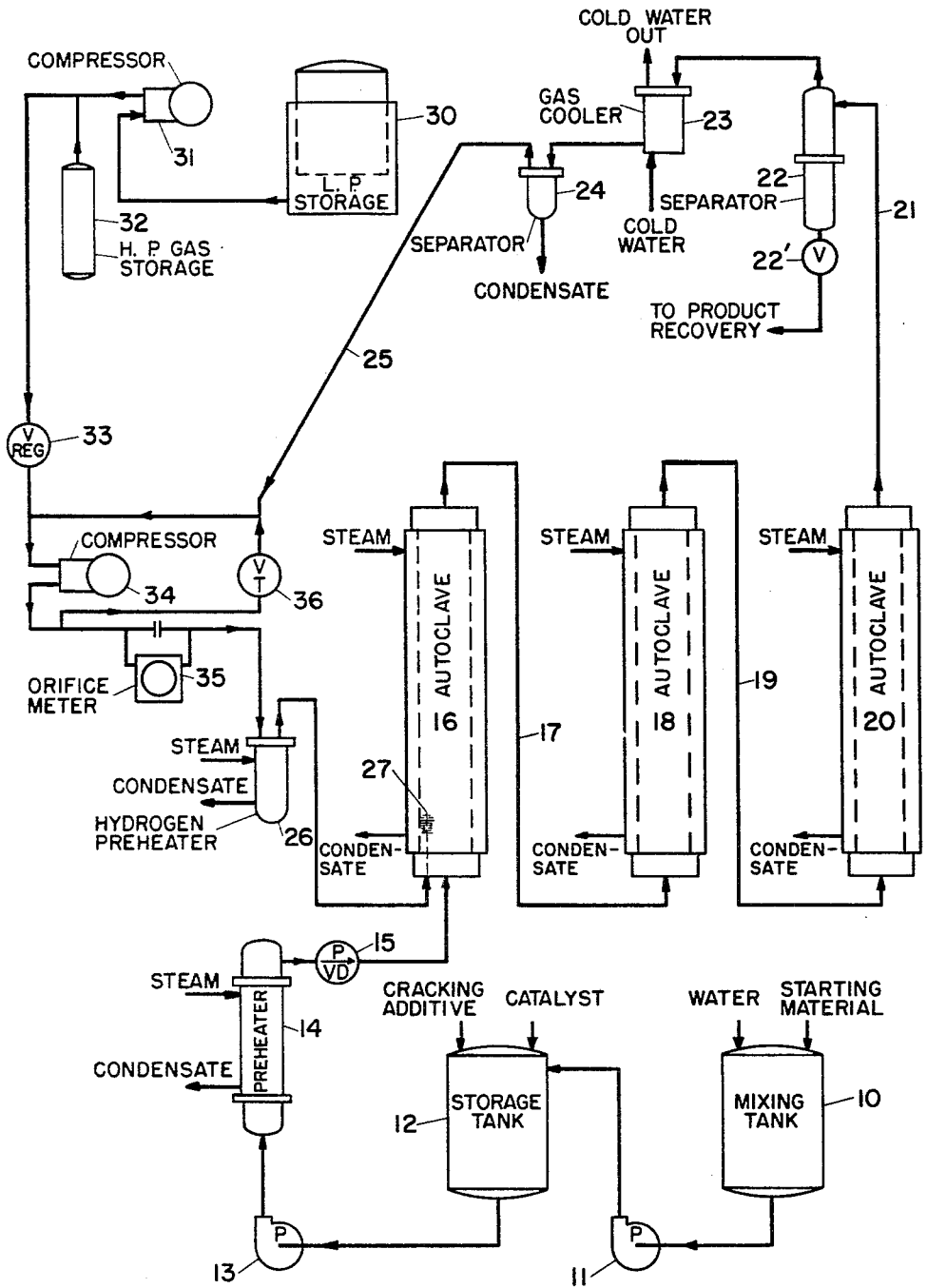

3,396,199
HYDROGENOLYSIS OF REDUCIBLE SUGARS TO OBTAIN A HIGH PERCENTAGE OF GLYCEROL
Leo Kasehagen, West Chester, Pa., assignor to Atlas Chemical Industries, Inc., Wilmington, Del., a corporation of Delaware
Continuation of application Ser. No. 211,183, July 20, 1962. This application Jan. 3, 1967, Ser. No. 607,079
10 Claims. (Cl. 260—635)

ABSTRACT OF THE DISCLOSURE

A process for the one-step continuous hydrogenolysis of reducible sugars to produce a product containing a high weight percent of glycerol is disclosed. Sugar solution and hydrogen are fed continuously to a pressure reactor in the presence of a hydrogenation catalyst and a cracking additive. The cracking additive is an alkaline earth metal oxide, hydroxide or weak acid salt in proportion to furnish from 0.25 to 1.0 weight percent of CaO equivalent based on the weight of sugar, and the catalyst is supported nickel in amount sufficient to furnish from 0.5 to 4.0% weight percent of nickel based on the weight of sugar. The reaction is conducted at a temperature of from 190° C. to 230° C. and at a pressure of at least 500 pounds per square inch.

This application is a continuation of S.N. 211,183 filed July 20, 1962 and now abandoned.

The present invention relates to a continuous one step hydrogenolysis process. The present process is particularly adapted to utilize reducible sugars or related carbohydrates to produce a product containing a high percent by weight of glycerin.

Hydrogenolysis is the cracking of the carbon to carbon linkage of a molecule with the simultaneous addition of hydrogen to each of the fragments produced by the cracking.

Generally the prior art methods of producing glycerin and short chain polyols from a starting material of reducible sugar and related carbohydrates require at least two separate stages or steps. Usually in the first stage the starting material, commonly a hexose, is hydrogenated to produce a polyol corresponding to the carbon chain length of the starting material and in the second stage the formed polyol is cracked, that is a carbon to carbon linkage int he molecule is broken, and hydrogenated further to produce a polyol product of a shorter carbon chain length than the polyol material fed into the second step. The two stage operation may be carried out in separate reactors or may be accomplished in a single reactor by varying the reaction conditions. Generally the first stage is carried out under neutral conditions, at a relatively low temperature, at relatively low pressure, and in the presence of a hydrogenation catalyst. Generally the second stage is carried out in the presence of a cracking agent, such as calcium carbonate, at a relatively high temperature and a relatively high pressure. In either case the prior art carbohydrate hydrogenolysis processes generally require two distinct and separate steps carried out under varied conditions to first hydrogenate and later crack and hydrogenate the starting material.

The present invention relates to a one step, continuous process for simultaneously cracking and hydrogenating a starting material or reducible sugar or related carbohydrate material to produce a hydrogenolysis reaction product. The reaction product contains a high percent by weight of polyols having a shorter carbon chain length than the starting material. In the present process a continuous feed of reducible sugar or related carbohydrate material, is reacted by intimately admixing the feed material with a continuous feed of hydrogen in a reaction zone in the presence of a hydrogenation catalyst and a cracking agent at a temperature of between about 190° C. and about 230° C. The polyol product of the present hydrogenolysis process is continuously removed from the reactor and, if desired, may be separated into its various components by suitable treatment, for example, distillation. As used in the present application the terms "continuous" and "continuously" are not intended to exclude operations which are pulsating or somewhat intermittent but which have an overall effect equivalent to a continuous operation.

Feed material

The feed or starting material of the present process is a reducible sugar or related carbohydrate material. Suitable reducible sugars, for example, may be hexoses, such as glucose or fructose; or pentoses, such as arabinose or xylose. Suitable related carbohydrates, for example, are starch hydrolyzates and particularly useful in the present invention are those hydrolyzates having a dextrose equivalent of at least 70. Preferably the feed material is in solution in order to facilitate easier handling and feeding operations. Water is a suitable solvent and may be used in any convenient concentration. Aqueous solutions of from about 30 to about 80% by weight of feed material are generally satisfactory. Aqueous solutions containing from about 50 to about 70% by weight of feed material are preferred in order to provide a sufficient supply of carbohydrate feed material for the process without an over-abundance of water and still maintain a feed material in liquid or slurry form that may be pumped from a supply tank into the reactor. Other solvents such as ethanol or methanol are suited to use in the present process. However, economics dictates that such solvents be recovered from the reaction mixture and reused, whereas if water is used as the carrier no solvent recovery process is required.

Reactor

The process may conveniently be carried out in apparatus substantially as described in the U.S. patent 2,642,462. This consists of a series of reactors through which hydrogen is continuously circulated. The apparatus of the '462 patent provides means for a continuous feed of sugar-catalyst slurry into the first reactor and means for the recovery of excess hydrogen, reaction product and spent catalyst from the last reactor. The present process may be carried out in a single reactor. However, the process is most efficient when it is carried out in a series of reactors. This is because the percent of starting material converted into short chain polyols in each reactor is additive, that is if the first reactor produced a product of, for example, 90% short chain polyols and 10% unreacted feed material, then passing this material through a second reactor would convert 90% of the remaining 10% of unreacted product into short chain polyols and give a product of 99% short chain polyols and 1% of unreacted feed material. Although theoretically an infinite number of reactors would be most efficient, however, in practice it has been found that 3 or 4 reactors in series gives a product which has both a high percent of conversion, that is, the product contains a high percent of volatile polyols as compared to the total weight of the reaction product and one that contains a high product split, that is, a high percent by weight of glycerin as compared to the percent by weight of materials in the product having a boiling point not higher than glycerin.

Hydrogenation catalyst

A hydrogenation catalyst is required in the present process. Although hydrogenation catalysts such as Raney nickel and copper chromite are suited, it is preferred to use a supported nickel catalyst. As is understood in the art of supported nickel catalysts, diatomaceous earth is one suitable support material. Preferably the catalyst is in powdered form to provide a large surface area and to facilitate addition of the catalyst into the feed material solution to form a catalyst-feed material slurry prior to entry into the reactor system. The latter slurry insures intimate contact of the feed material and the catalyst and provides an easy means of adding the required amount of catalyst into the process. It is desirable in the present process to utilize a promoted nickel catalyst, that is a nickel catalyst promoted with another metal or metals. With a nickel catalyst, iron and copper have been found to be useful promoters in the present process. One suitable catalyst may consist of nickel supported on diatomaceous earth, (e.g. Johns-Manville Hyflo Super Cel), with a nickel content of about 20% by weight, an iron content of about 1% by weight, and a copper content of about 3% by weight. While none of these percentages is critical, the foregoing example of a suitable catalyst indicates a type of catalyst found useful in the present process. The catalyst may be prepared by suspending the carrier material in a solution of metal nitrates and then adding sodium carbonate. Upon the addition of the carbonate, the metals are precipitated on the carrier material as their hydroxides and carbonates. The carrier and precipitate may then be washed, dried and ground. The ground mixture may be activated by contact with hydrogen in a furnace at about 500° C. The activation reduces the metals to their free state and an activated supported catalyst product is recovered. The amount of catalyst required in the present process is variable and depends upon the activity of the catalyst. Preferably sufficient catalyst is used to provide a weight of nickel ranging from about 0.5% to about 4.0% based on the weight of the carbohydrate material in the process feed material. The spent catalyst from the hydrogenolysis process may be recovered from the reaction mixture and reworked by dissolving, precipitating and reactivating. A range of from about 1.0% to about 2.0% by weight of nickel based on the weight of carbohydrate in the feed material generally provides enough catalyst to promote the reaction without adding an undesirably high surplus of catalyst which must be recovered from the reaction product.

Cracking additive

The present process utilizes a cracking additive. Cracking or fracturing of the carbon chain of the molecules of feed material is inadequate at normal temperatures and although cracking may be made adequate by high temperatures, as in prior art hydrogenolysis processes, the product split is then lower than desired. Generally oxides, hydroxides and salts of alkaline earth metals may be effectively utilized as cracking additives in the present invention. Calcium oxide, calcium hydroxide, calcium carbonate and salts of calcium and weak acids, such as, for example, calcium gluconate and calcium acetate, are eminently suited and readily available. Generally a concentration of from about 0.25 by weight of the cracking additive (calculated as calcium oxide equivalent) based on the weight of carbohydrate material in the feed material is adequate and it is seldom necessary to exceed 1.0% by weight of the carbohydrate in the feed material. Calcium oxide in a concentration of about 0.5% has been found to perform quite satisfactorily in the present process.

Temperature

The reaction temperature range of the present process extends from about 190° C. to about 230° C. At temperatures lower than 190° C. the reaction is too slow to be practical. At temperatures higher than 230° C. glycerin, one of the most desirable products, rapidly decomposes and reduces the product split. It has been found that temperatures ranging from about 200° C. to about 220° C. are eminently satisfactory. If a series of reactors is utilized it is not necessary that each of the reactors operate at the same temperature providing they are all within the reaction temperature range. In such operations, it has been found that the first reactor may profitably be operated at a slightly higher temperature, say about 210° C., than the remaining reactors which would operate at say about 200° C. This operational arrangement generally insures that the hydrogenolysis reaction is more than 50% completed in the first reactor and the heating requirement of the remaining reactors to improve the polyol yield can be lessened. For practical purposes, as explained in the Reactor section above, the efficiency of the process is not noticeably improved if more than four reactors are utilized.

Pressure

A positive hydrogen pressure promotes the reaction and results generally improve as the pressure increases up to about 2000 p.s.i. Above that pressure little improvement is shown, at least insufficient such to warrant the special apparatus which would be required. In general pressures between about 1500 and 2000 p.s.i. have been found to give the best results as a practical matter. The use of pressure below about 500 p.s.i. probably would not be warranted in view of the better results which may be obtained in the preferred range.

Product split

The hydrogenolysis reaction mixture is a mixture of polyols with a minor amount of unreacted carbohydrate feed material. At the present time glycerin is the most valuable individual compound. The present process is designed to obtain a polyol product rich in glycerin. The hydrogenolysis product from a reactor contains uncracked hexitols, pentitols, and tetritols all of which could theoretically be cracked to produce glycerin if they were recycled or passed on to another reactor. Thus in considering the efficiency of a hydrogenolysis process, the percent of conversion, that is the amount by weight of volatiles, glycerin and materials having boiling points below glycerin, compared to the amount by weight of starting material, must be considered. However, also important and to be considered in a process for producing a glycerin rich product is the percent by weight of materials converted into products having boiling points below glycerin, that is, material cracked "beyond" glycerin. These materials represent a portion of the product which has lost its potential as a source of glycerin in the process. This factor may be expressed in terms of a product split and expressed:

$$\text{Product split} = \frac{\text{percent glycerin in reactor product}}{\text{percent volatiles in reactor product}}$$

"volatiles" being defined as all compounds in the reactor product which are not higher boiling than glycerin. The non-glycerin volatiles are recoverable as products of the hydrogenolysis process, however they are completely lost as far as a potential source of glycerin is concerned.

Reaction time

Preferably the reaction time, that is the residence time of the feed material in the reactors, is between about 1½ and about 6 hours. While times of less than 1½ hours may be utilized, the higher temperature required to carry out the reaction in such short time undesirably effects the product split. Conversely times of over 6 hours may be utilized, however, the size of the equipment which would be required to carry out the reaction over such an extended period of time would be impractically large. A reaction time of about 2 hours has been found to be eminently satisfactory.

FIGURE I is a flow sheet of a typical reactor arrangement which may be used to carry out the present invention. The sugar or other related carbohydrate starting material and water are introduced into mixing tank 10 in suitable proportions to make a solution of the desired concentration. A reducible sugar is a suitable starting material. Solution from the mixing tank is pumped by pump 11 into storage tank 12 in which a diatomaceous earth supported reduced nickel in finely divided form and a cracking additive are added in proportion to give the desired catalyst to sugar and cracking additive to sugar ratio. Storage tank 12 is an agitated tank in which the slurry of catalyst, cracking additive and sugar solution is kept in a substantially homogeneous mixture. The pump 13 moves the slurry from the storage tank 12 to the pre-heater 14 to warm the slurry before introducing it into the autoclave. A variable delivery pump 15 feeds the pre-heated slurry into the bottom of the first autoclave 16 at a selected rate.

Hydrogen for the process is initially drawn from a low pressure storage tank 30, compressed by the compressor 31 and stored in high pressure gas storage bottle 32. From the bottle 32 hydrogen is admitted to the reactors through the regulating valve 33, circulating compressor 34, orifice meter 35, hydrogen pre-heater 26 and perforated nozzle 27 in the lower end of the first autoclave 16. Nozzle 27 permits intimate admixture of the feed slurry and the hydrogen feed. After the system is filled with hydrogen the main body of hydrogen in the reactors is maintained by a circulating system, to be described hereinafter, with the addition of make-up hydrogen from the high pressure storage bottle 32 as required to replace chemically combined hydrogen and any losses that may have occurred in the system.

The autoclave 16 is jacketed and heated to maintain the operating temperature. The slurry and hydrogen introduced into the bottom of the autoclave 16 move upwardly through a reaction zone out of the top of the autoclave through a pipe 17 and into the bottom of the second autoclave 18 which is also a jacketed and heated vessel. The slurry and hydrogen progress upwardly through the reaction zone, the autoclave 18 and are drawn off in the pipe 19 and introduced at the bottom of the third autoclave 20 which is of the same jacketed and heated construction as autoclaves 16 and 18. It will be understood that the process is not limited to the use of three autoclaves, this number being shown for purpose of illustration. Slurry, which at this time consists of a solution of the hydrogenolysis products with a small amount of unreacted starting material (the exact amount will depend upon the extent of hydrogenolysis in the system), suspended spent catalyst and spent cracking additive, passes through a pipe 21 to a gas and liquid separator 22 in which free hydrogen gas is separated from the slurry. The slurry is drawn from the bottom of the separator 22, is reduced to atmospheric pressure through a valve 22', and passes to a product recovery system for recovery of the suspended spent catalyst and other treatments as required.

Hydrogen from the separator 22 is carried to the gas cooler 23 where its temperature is lowered to permit condensation of water vapor. The cooled gas is passed through a water separator 24 and the separated water drained off. Hydrogen from the separator 24, which is still at substantially operating pressure, is returned to the low pressure side of the circulating compressor 34 through the line 25. The circulating compressor, in the illustrated form of the apparatus, runs at constant speed and is provided with a by-pass controlled by the throttle valve 36 for the purpose of permitting the maintenance of a selected rate of flow into the reactors. The meter 35 measures the rate of flow into the reactors and the valve 36 can be controlled either manually or by means of well-known automatic meter-responsive controls, to compensate for fluctuation in the system. The regulating valve 33 is preferably a pressure responsive valve which automatically admits make-up hydrogen from the high pressure storage bottle 32 as required to maintain the pressure of hydrogen in the system.

In the system illustrated, the rate of feed of the sugar and catalyst slurry can be varied by adjustment of the variable delivery pump 15. The rate of hydrogen feed can also be varied by the setting of the throttle valve 36. By means of these adjustments the rate of hydrogen feed relative to the rate of hydrogen usage in the chemical reaction can be adjusted to a value which is required for maximum performance in accordance with the teachings of this invention.

The following examples are illustrative of the present invention, but are not to be taken as limiting the invention to the specific conditions recited.

Each of the following examples were carried out using reactors having a 3 5/16 inch inside diameter and except where noted in Examples VII and VIII, the reactors were 6 feet high.

EXAMPLE I

A 50% solution of glucose in water was made into a slurry with a diatomaceous earth supported reduced nickel catalyst promoted with iron in proportions to give 1.5% by weight of nickel based on the weight of glucose and a cracking additive consisting of 0.5% by weight of calcium oxide and 0.05% by weight of calcium carbonate based on the weight of glucose. This slurry was continuously fed into the bottom of the first of four cylindrical reactors having 3 5/16 inch inside diameters and each being 6 feet high, at the rate of 6.0 liters per hour. Each of the reactors was held at 200° C. and hydrogen pressure was maintained at 2000 p.s.i.g. Hydrogen was continuously fed into the reactor through a perforated distributing nozzle to obtain an intimate admixture of hydrogen and feed material. The hydrogen was fed at a rate of 1360 cubic feet per hour (expressed at 0° C. and at 1 atmosphere pressure). The hydrogenolysis reaction product from the third reactor had a conversion of 66.2% and a 0.60 product split. The reaction product from the fourth reactor had a conversion of 77.8% and a product split of 0.51.

EXAMPLE II

A 50% solution of invert sugar in water was made into a slurry with a catalyst and a cracking additive in the same proportions as Example I. The slurry was continuously fed into a reactor system as described in Example I at the rate of 10.1 liters per hour. The reactors were all maintained at 200° C. and at a hydrogen pressure of 2000 p.s.i.g. Hydrogen was continuously fed into the reactor receiving the slurry at a rate of 1020 cubic feet per hour at standard conditions and the extent of hydrogenolysis measured. The product was found to be 56.8% converted and the product split was found to be 0.65.

EXAMPLE III

A 50% solution of invert sugar in water was made into a slurry with a reduced, iron-copper promoted, nickel catalyst supported on diatomaceous earth in a proportion to give 1.1% by weight of nickel to the weight of sugar and a cracking additive of calcium oxide in a proportion to give 0.5% by weight compared to the weight of sugar. The slurry was continuously fed into the first of four reactors in a reactor system as described in Example I at a rate of 21.8 liters per hour. The reactors were all maintained at 210° C. and hydrogen pressure was maintained at 2000 p.s.i.g. Hydrogen was continuously fed into the first reactor with the slurry at a rate of 1680 feet per hour at standard conditions. The reaction product was found to have a conversion of 63.4% and a product split of 0.59.

EXAMPLE IV

A 50% solution of invert sugar in water was made into a slurry with a supported reduced, iron-copper promoted, nickel catalyst in a proportion to give 1.5% by weight of nickel to the weight of sugar and a cracking additive of calcium oxide in a proportion to give 0.4% by weight compared to the weight of sugar. The slurry was continuously fed into a reactor system similar to that described in Example I except three reactors were utilized instead of four. The slurry was fed into the system at a rate of 15.5 liters per hour. The reactors were all maintained at 220° C. and hydrogen pressure was maintained at 2000 p.s.i.g. Hydrogen was continuously fed into the first reactor with the slurry at a rate of 1186 feet per hour at standard conditions. The reaction product was found to have a conversion of 64.2% and a product split of 0.58.

EXAMPLE V

A 50% aqueous solution of invert sugar prepared from high test molasses was made into a slurry with a supported reduced, iron-copper promoted, nickel catalyst in a proportion to give 1.5% by weight of nickel to the weight of sugar and a cracking additive of calcium oxide in a proportion to give 0.5% by weight compared to the weight of sugar. The slurry was continuously fed into the reactor system similar to that described in Example I except five reactors were utilized instead of four. The slurry was fed at a rate of 10.1 liters per hour. The reactors were all maintained at 200° C. and hydrogen pressure was maintained at 2000 p.s.i.g. Hydrogen was continuously fed into the first reactor with the slurry at a rate of 1063 feet per hour at standard conditions. The reaction product from the fourth reactor was found to have a conversion of 64.0% and a 0.60 product split. The reaction product from the fifth reactor was found to have a conversion of 71.5%, and a product split of 0.54.

EXAMPLE VI

A 50% aqueous solution of invert sugar prepared from high test molasses was made into a slurry with a supported reduced, iron-copper promoted, nickel catalyst in a proportion to give 1.5% by weight of nickel to the weight of sugar and a cracking additive of calcium oxide in a proportion to give 0.5% by weight compared to the weight of sugar. The slurry was continuously fed into the first of five reactors in a reactor system as described in Example I at a rate of 14.5 liters per hour. The reactors were all maintained at 210° C. and hydrogen pressure was maintained at 2000 p.s.i.g. Hydrogen was continuously fed into the first reactor with the slurry at a rate of 1680 feet per hour at standard conditions. The reaction product from the fourth reactor was found to have a conversion of 66.6% and a product split of 0.62. The product from the fifth reactor was found to have a conversion of 69.4% and a product split of 0.58.

EXAMPLE VII

A 50% aqueous solution of invert sugar prepared from high test molasses was made into a slurry with a supported reduced, iron-copper promoted, nickel catalyst in a proportion to give 1.5% by weight of nickel to the weight of sugar and a cracking additive of calcium oxide in a proportion to give 0.5% by weight compared to the weight of sugar. The slurry was continuously fed into the first of three reactors in a reactor system as described in Example I at a rate of 15.5 liters per hour. The reactors were all maintained at 220° C. and the hydrogen pressure was maintained at 2000 p.s.i.g. The first reactor was reduced to an effective height of 4.8 feet while the remaining reactors were maintained at an effective height of 6 feet. Hydrogen was continuously fed into the first reactor with the slurry at a rate of 1186 feet per hour at standard conditions. The reaction product was found to have a conversion of 65.5% and a product split of 0.60.

EXAMPLE VIII

A 50% aqueous solution of invert sugar prepared from high test molasses was made into a slurry with a supported reduced iron-copper promoted nickel catalyst in a proportion to give 1.5% by weight of nickel to the weight of sugar and a cracking additive of calcium oxide in a proportion to give 0.4% by weight of sugar. The slurry was continuously fed into the first of five reactors in a reactor system as described in Example I at a rate of 12.6 liters per hour. The first reactor was maintained at 220° C. and the remaining reactors were maintained at 200° C. A hydrogen pressure of 2000 p.s.i.g. was maintained in the reactor system. The first reactor was reduced to an effective height of 4.8 feet while the remaining reactors were maintained at an effective height of 6 feet. Hydrogen was continuously fed into the first reactor with the slurry at a rate of 1325 feet per hour at standard conditions. The reaction product from the fourth reactor was found to have a conversion of 62.4 and a product split of 0.65. The reaction product from the fifth reactor was found to have a conversion of 68.5% and a product split of 0.61.

What is claimed is:

1. The process for the continuous hydrogenolysis of a reducible hexose which comprises reacting in intimate admixture, at a pressure of at least 500 pounds per square inch, a continuous feed of an aqueous solution containing from 30 to 80 weight percent of a reducible hexose and hydrogen in a reactor in the presence of a supported nickel hydrogenation catalyst in proportion sufficient to furnish from 0.5 to 4.0% by weight of nickel based on the weight of hexose and a cracking additive selected from the group consisting of alkaline earth metal oxides, hydroxides and their weak acid salts in proportion sufficient to furnish from 0.25 to 1.0% by weight of CaO equivalent based on the weight of hexose at a temperature of from about 190° C. to about 230° C.

2. The process of claim 1 wherein the reducible hexose is glucose.

3. The process of claim 1 wherein the temperature is between about 200 and 220° C.

4. The process of claim 1 wherein the supported nickel catalyst is promoted by iron and copper.

5. The process of claim 1 wherein the said alkaline earth compound is a calcium compound.

6. The process of claim 1 wherein the said reactor is vertical and a slurry of the said catalyst, in finely divided form, and the said cracking additive in a hexose feed material and gaseous hydrogen are fed continuously into the lower end thereof.

7. The process of claim 6 wherein the said hexose is glucose and the temperature is between about 200 and 220° C.

8. The process of claim 6 wherein the said hexose is high test molasses and the temperature is between about 200 and 220° C.

9. The process of claim 6 wherein the said supported nickel catalyst is promoted by iron and copper.

10. The process of claim 6 wherein the said alkaline earth compound is a calcium compound.

References Cited

UNITED STATES PATENTS

| 1,963,999 | 6/1934 | Larcher | 260—635 |
| 2,319,590 | 5/1943 | Eastman et al. | 208—120 |
| 2,325,207 | 7/1943 | Stengel et al. | 260—635 |
| 2,335,731 | 11/1943 | Bottoms | 260—635 |
| 2,642,462 | 6/1953 | Kasehagen | 260—635 |
| 2,852,570 | 9/1958 | Conradin et al. | 260—635 |
| 3,030,429 | 4/1962 | Conradin et al. | 260—635 |

FOREIGN PATENTS

| 156,785 | 1/1953 | Australia. |
| 528,064 | 10/1940 | Great Britain. |
| 612,099 | 11/1960 | Italy. |

OTHER REFERENCES

Ser. No. 295,616, Giulio Natta et al. (A.P.C.), published Apr. 20, 1943.

BERNARD HELFIN, *Primary Examiner.*

J. E. EVANS, *Assistant Examiner.*

UNITED STATES PATENT OFFICE
CERTIFICATE OF CORRECTION

Patent No. 3,396,199

August 6, 1968

Leo Kasehagen

It is certified that error appears in the above identified patent and that said Letters Patent are hereby corrected as shown below:

Column 1, line 47, "int he" should read -- in the --.
Column 2, line 10, cancel "under varied conditions to first hydrogenate and later".

Signed and sealed this 20th day of January 1970.

(SEAL)
Attest:

Edward M. Fletcher, Jr.
Attesting Officer

WILLIAM E. SCHUYLER, JR.
Commissioner of Patents